United States Patent [19]

Gruere et al.

[11] Patent Number: 5,794,167
[45] Date of Patent: Aug. 11, 1998

[54] MICROPROCESSOR BASED RELIABILITY SYSTEM APPLICABLE, IN PARTICULAR, TO THE FIELD OF RAIL TRANSPORT

[75] Inventors: Yves M Gruere, Jouy En Josas; Laurent A DeMichel, Corbeil; Hervé L Le Gall, Saint Remy Les Chevreuse, all of France

[73] Assignee: CSEE-Transport, Paris, France

[21] Appl. No.: 762,147

[22] Filed: Dec. 9, 1996

Related U.S. Application Data

[63] Continuation of Ser. No. 228,716, Apr. 18, 1994, abandoned.

[30] Foreign Application Priority Data

Apr. 21, 1993 [FR] France ................. 93-04680

[51] Int. Cl.⁶ ........................................ G06F 19/00
[52] U.S. Cl. ...................... 701/29; 701/33; 701/19; 371/68.1
[58] Field of Search ................. 364/424.034, 424.04, 364/431.01, 431.04, 550, 551.01; 340/438, 439; 371/67.1, 68.1; 701/19, 29, 33, 35

[56] References Cited

U.S. PATENT DOCUMENTS

| | | | |
|---|---|---|---|
| 4,130,241 | 12/1978 | Meredith et al. | 371/68.3 |
| 4,181,945 | 1/1980 | Adler et al. | 371/68.3 |
| 4,198,678 | 4/1980 | Maatje et al. | 371/68.3 |
| 4,251,873 | 2/1981 | Joby | 371/68.3 |
| 4,400,792 | 8/1983 | Strelow | 371/68.3 |
| 4,590,549 | 5/1986 | Burrage et al. | 371/68.3 |
| 4,998,194 | 3/1991 | Okamoto et al. | 364/187 |
| 5,001,638 | 3/1991 | Zimmerman et al. | 364/431.04 |
| 5,067,080 | 11/1991 | Farman | 364/431.04 |
| 5,142,474 | 8/1992 | Miyata et al. | 364/424.03 |
| 5,274,554 | 12/1993 | Takats et al. | 371/68.1 |

FOREIGN PATENT DOCUMENTS

| | | |
|---|---|---|
| 0 346 804 | 12/1989 | European Pat. Off. . |
| 0 496 509 | 7/1992 | European Pat. Off. . |
| 32 25 455 | 1/1984 | Germany . |
| WO 89/10865 | 11/1989 | WIPO . |

OTHER PUBLICATIONS

"Fault Tolerance in Continuous Process Control", William F. McGill et al., *IEEE Micro*, vol. 4, No. 6, Dec. 1984, pp. 22–23.

"The Safety Matrix—A Method for Guidelining Industrial Microcomputers", Victor J. Maggioli, *IEEE Transactions on Industry Applications*, vol. 25 No. 3, May/Jun. 1989, pp. 514–522.

*Primary Examiner*—Gary Chin
*Attorney, Agent, or Firm*—Oliff & Berridge, PLC

[57] ABSTRACT

Microprocessor based safety system applicable, in particular, to the field of rail transport, for monitoring and controlling actuators (ACT) as a function of the data supplied by sensors (CP), characterized in that it includes at least two microprocessors (P1, P2) in parallel handling the same application, the inputs of which receive the pre-encoded data (DE) from the sensors (CP), and the output data of which is read back in safety for comparison with the input data, and a third, comparison microprocessor (P3) known as a voter, for comparing, using software and in safety, the encoded characteristic results (R1, R2) of the two application microprocessors (P1, P2) and operating in consequence a dynamic controller (CD) authorizing the transmission of the output data (DS) to the actuators (ACT).

6 Claims, 1 Drawing Sheet

MICROPROCESSOR BASED RELIABILITY SYSTEM APPLICABLE, IN PARTICULAR, TO THE FIELD OF RAIL TRANSPORT

This is a Continuation of application Ser. No. 08/228,716 filed Apr. 18, 1994 now abandoned.

BACKGROUND OF THE INVENTION

1. Field of the Invention

The present invention relates to a microprocessor based safety system applicable, in particular, to the field of rail transport, to monitor and control actuators as a function of the data supplied by sensors.

2. The Related Art

In all safety orientated systems and, in particular, in rail transport, safety, until recently, was ensured using composants and circuits complying with intrinsic safety, or failsafe, rules.

Intrinsic safety is based on the laws of physics, for example the law of gravity, and on an exhaustive fault model. Any fault must place the system in a "restrictive" state, that is to say one that restricts its operational functionalities. In railway systems, the restrictive state is generally one that leads to the halting of the train.

Since microprocessors made their appearance, they have come to play a part in providing these safety functions. The design of these programmed safety systems is based on two principles, namely information redundancy through information encoding, consisting in adding to the functional data monitoring components which permit the detection of errors and malfunctions in the system to be rendered safety, and hardware redundancy, consisting in the use of several computers in parallel, and in comparing the results by means of hardware or software components.

In the technique of information encoding, only one microprocessor is used, but the latter works on redundant information comprising a functional part and an encoded part. This makes it possible to have an algorithm duplicated for two different sets of information. The resulting signature of the algorithm is sent to an external controller designed on the failsafe basis, known as a dynamic controller. If the result belongs to the code, it is validated by the said controller, which authorizes the safety outputs to be propagated to the outside, that is to say to the actuators. If this is not the case, these outputs are invalidated and laced in their restrictive state. It should be noted that, most of the time, the safety outputs are effected functionally, and then read back and compared in safety with the control values.

Depending on the power of the encoding used, this so-called 'encoded processor' technique gives a greater or lesser error non-detection probability, but the drawbacks reside in a major increase in computing time and in complex programming. On the other hand the safety of the system does not demand any particular technological precautions, which makes it possible to use any industrial type microprocessor that is commercially available.

In the hardware redundancy technique, safety is ensured by installing at least two microprocessors in parallel. Comparison and authorization are effected externally, either by mutual comparison or using hardware designed using intrinsic safety techniques. The application software is installed in the two microprocessors, either in an identical fashion or with the deliberate introduction of dissymmetry.

To ensure a high level of safety with such a technique, known as the 'dual-processor' technique, steps have to be taken to prevent common mode failures, which necessitates the complete independence of the two data processing sequences, in particular using separate buses and duplication of all the hardware units. Steps must also be taken to prevent latent faults, which makes it practically compulsory to add self-tests and/or cross testing.

Synchronization of the microprocessors can be a delicate matter, and safety is based on knowledge of the behaviour of these microprocessors. On the other hand, there is no computing overload, since the information is not encoded.

However, when the comparator is designed on a failsafe basis, the quantity of safety hardware, dedicated to the application, can lead to prohibitive costs.

SUMMARY OF THE INVENTION

The main object of the present invention is thus to remedy the drawbacks of the prior art techniques, while reserving the advantages offered by each of these techniques.

For this purpose, the present invention proposes a microprocessor based safety system which is essentially characterized in that it includes at least two microprocessors in parallel handling the same application, the inputs of which receive the pre-encoded data from the sensors, and the output data of which is read back in safety, for comparison with the input data, and a third, comparison microprocessor known as a 'voter', for comparing, using software and in safety, the encoded characteristic results of the two application microprocessors and operating in consequence a dynamic controller authorizing the transmission of the output data to the actuators.

Thanks to this configuration, in which only the input and output data are encoded, the application itself does not need to be encoded by reason of the dual processing, so that the computing time remains with reasonable limits. In addition, the quantity of safety hardware required is small, thus making it possible to lower the overall cost of the system. Finally, and as will be more clearly understood hereinafter, such a system is easy to implement and further offers great flexibility.

Preferably, a time lag is introduced between the two application microprocessors, making it possible to avoid the common mode failures inherent, for example, in electromagnetic interference. Also preferably, the safety system according to the invention comprises a single non-dedicated common bus via which the information transits between the different microprocessors.

This is made possible thanks to the fact that the security of the information in transit is ensured by encoding and dating.

BRIEF DESCRIPTION OF THE DRAWINGS

Further characteristics and advantages of the present invention will emerge from the description that follows, given with reference to the annexed drawings, wherein.

DETAILED DESCRIPTION OF PREFERRED EMBODIMENTS

Generally speaking, all safety systems, also known as monitoring and control systems, operate on the basis of sensors and actuators. They acquire analog inputs, convert these inputs into digital data, process this data using algorithms and generate digital outputs that are converted into analog outputs permitting operation of the actuators.

Figure 1:
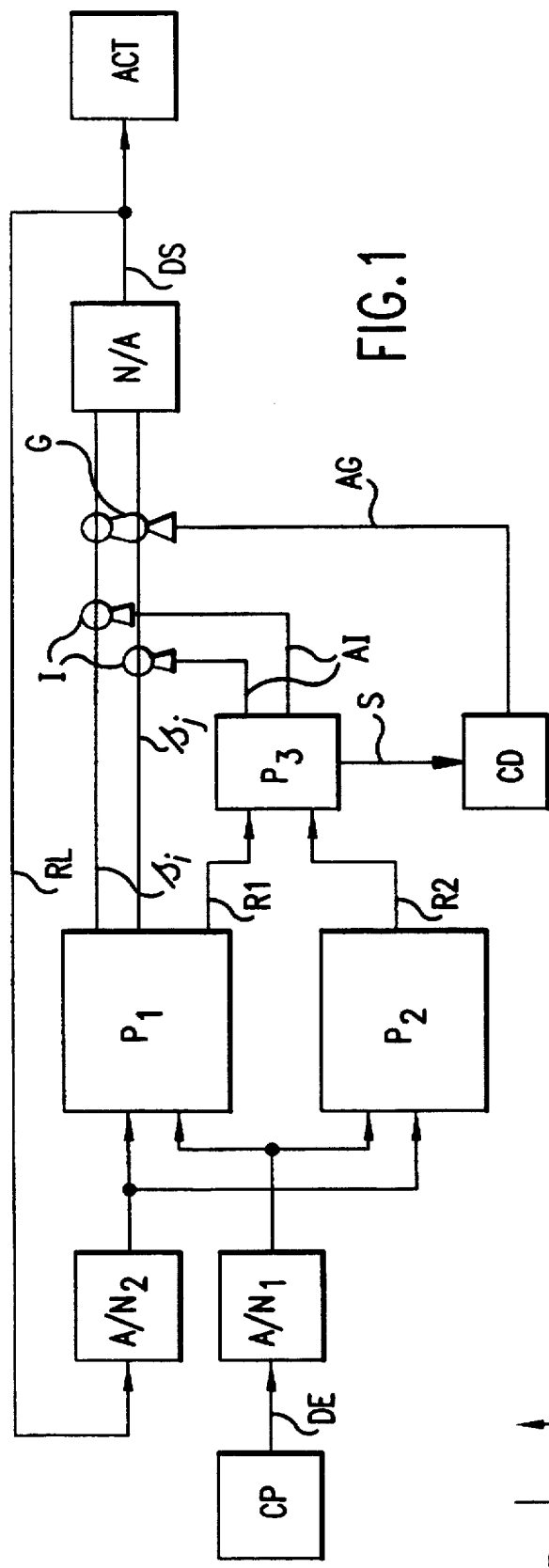
FIG. 1 is a block diagram illustrating the operation of a safety system according to the invention.

In the diagram of FIG. 1, we see firstly, then, one or more input sensors, such as CP supplying the input data DE to the system. This analog type input data DE is then memorized and encoded in an analog/digital converter $A/N_1$, before being applied to the inputs of the two application processors P1 and P2 arranged in parallel and handling the same application. The application itself does not require encoding by reason of the dual processing. On the other hand, the input and output data are encoded using the encoded processor technique. In each processor, the data is thus decoded and then processed. In addition, each processor performs the application with a certain time lag, the purpose of this being to avoid common mode failures such as those that are caused, for example, by electromagnetic interference.

The results, R1 and R2, of the processing carried out by each processor P1 and P2 are finally encoded by the said processors before being transmitted to a third, comparison processor P3, also known as a 'voter'.

Voter P3 compares the results R1 and R2, using software and in safety, by applying the encoded processor technique. As its inputs have been encoded by the two processors, P1 and P2, the voter's algorithm consists in comparing the values of the results R1 and R2. If the results of this comparison are satisfactory, the voter sends a signature S, characteristic of its correct operation, to a dynamic controller CD designed on a failsafe basis. This dynamic controller CD then authorizes general transmission of the functional outputs such as $s_i$ and $s_j$ of the application processors, as illustrated at G, via a link AG. It will be noted here that only the functional outputs of one of processors P1 and P2 is effectively used. Furthermore, in the event of discrepancies in a few results only, only the corresponding outputs are inhibited by the voter, as illustrated at I, via links AI.

The digital data of functional outputs $s_i$ and $s_j$ are then converted into analog output data in a digital/analog converter N/A in order to permit operation of actuators such as ACT. Furthermore, this output data DS, after conversion in a second analog/digital converter $A/N_2$, is read back and compared with the digital data initially computed, as illustrated by link RL, thus permitting monitoring in safety.

Figure 2:
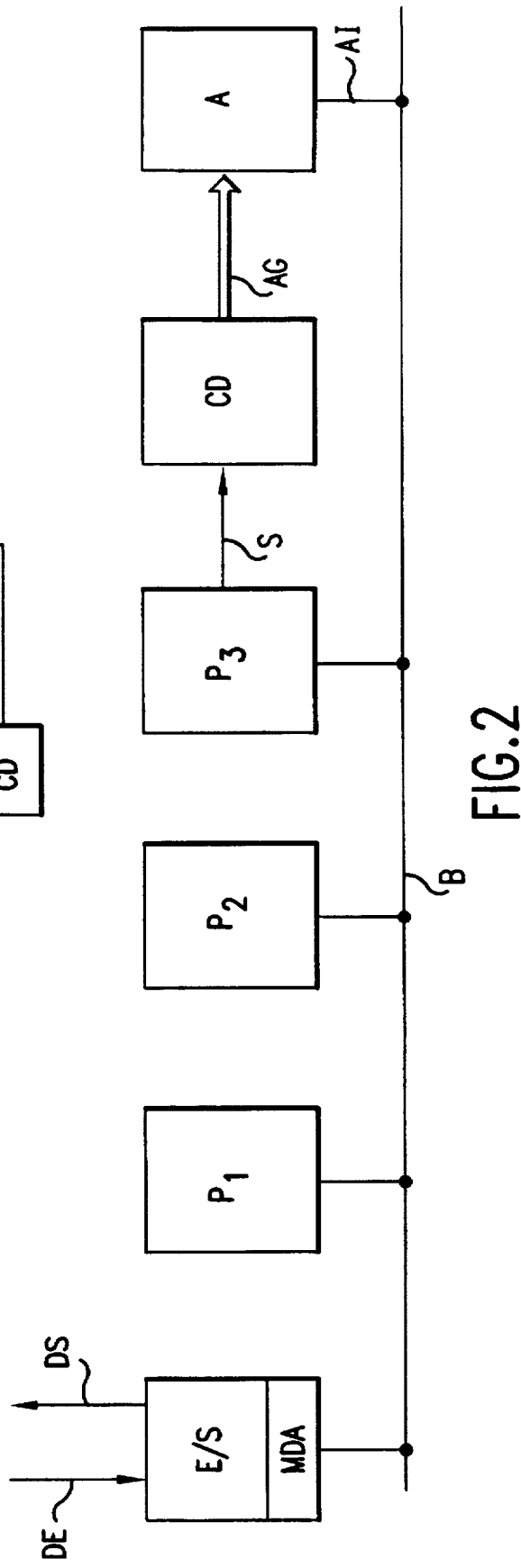
FIG. 2 is a block diagram showing the physical architecture of this safety system.

There now follows a more detailed description of the operation and advantages of the present invention, with particular reference to FIG. 2, which schematically represents the physical architecture of a safety system according to the invention.

This figure shows, firstly, the three processors, P1, P2 and P3, which are connected to a common, non-dedicated and standardized bus, via which all the information transits between the different modules going to make up the safety system. This bus does not, in fact, have any particular safety constraints, since the security of the information transiting via it is ensured by encoding and dating.

The figure then shows an input/output coupler E/S via which transit the input data DE and the output data DS. It is, in fact, essential for the inputs to be acquired by a single entity, in order to ensure that the application processors P1 and P2 carry out their processing on the same inputs. These inputs are acquired in encoded form, using the encoded processor technique, and made available to application processors P1 and P2 in a dual access memory MDA connected to bus B. Throughout the transmission phase (coupler, bus, serial link), the safety data is protected by encoding.

When the data has been acquired, the two application processors, P1 and P2, are activated, a certain time lag being observed. Each processor reads from dual access memory DMA the inputs acquired, and validates them one by one. Once they have been validated, these inputs are used in their non-encoded form for processing purposes. Upon completion of the execution of the application, each processor computes its outputs and prepares its results, which are encoded using the encoded processor technique.

Physical outputting is effected by a single one of the two processors P1 and P2, via the input/output coupler E/S, while the results R1 and R2 of the processing carried out by each processor are made available to the voter, formed by the third processor P3, in the dual access memory MDA, in encoded and dated form. In addition, each of processors P1 and P2 executes its own self-tests, the results of which are integrated in results R1 and R2 supplied to voter P3.

The security of the dual-processor architecture resides primarily in the absence of a mode common to P1 and P2. Owing to the fact that comparison is carried on the outputs, designers have the advantage of considerable flexibility in designing modules P1 and P2. This can range from having two identical softwares on two identical boards to having two different softwares on two different units of hardware.

Voter P3 acquires the results R1 of P1 and R2 of P2 and compares them, two by two, using the appropriate operations on the encoded data according to the encoded processor technique. Performance of the comparison function by software enables consistency checks to be run on the outputs and/or filtering on each output. Designers thus benefit from considerable flexibility in designing the voter, and can provide partial inhibition of the outputs, which permits reconfiguration on these outputs when they are duplicated. In addition, the voter monitors in safety the correct operation of the dual processor structure, that is to say the time lag and the results of the self-tests.

The comparison logic of voter P3 is installed on a processor electronics board which can be identical with the boards of the dual processor structure, and the security of the comparison function is ensured using the information encoding technique. The function is validated by sending the signature S, computed by the voter and characteristic of its correct operation, to dynamic controller CD. In addition, this signature is rendered dynamic by so-called refreshing information which evolves in time. Dynamic controller CD, designed on a failsafe basis, will thus validate, on one hand, the correct refreshment of the signature and, on the other hand, the signature itself, thus guaranteeing the correct operation of the voter.

Dynamic controller CD then authorizes general transmission of the outputs via a module A connected to bus B, this module A authorizing the individual transmission of the outputs as a function of the information supplied by the voter. In other words, in the event of partial discrepancy between results R1 and R2, only the differing outputs are inhibited or placed in restrictive state. In the event of a malfunction of the voter, all the outputs of the application are, of course, placed in their restrictive states. If necessary, in order to improve availability, the voter can itself be provided with redundancy.

It is clear then, in the final analysis, that the safety system according to the present invention offers very considerable flexibility and makes it possible to satisfy the desired safety requirements at a reasonable cost and with reasonable computing time.

It will be noted, in particular, that such an architecture makes it easy to extend the invention to a more complex structure comprising more than two application processors.

The software of the voter can then, without additional hardware, provide majority logic for n out of p processors. In other words, n processors at least out of the p processors must have the same results for the safety outputs to be validated. It goes without saying, moreover, that, in this case, the voter's software can be installed in any one of the application processors.

We claim:

1. A microprocessor based safety system applicable to the field of railroad transportation, the system comprising: sensors;

at least two microprocessors handling a same application associated with the railroad transportation, wherein inputs of the two microprocessors receive data from the sensors;

a third comparison microprocessor to compare results from the two microprocessors and to drive a dynamic controller authorizing the sending of output data to activators associated with the railroad transportation, wherein inputs and outputs of the two microprocessors are coded by coded-processor technology, the third comparison microprocessor makes a comparison, using software and in a secure manner, of the coded results from the two microprocessors using the coded-processor technology, and the output data associated with the third comparison microprocessor is reread by one of the at least two microprocessors in a secure manner so it can be compared with the input data of the at least two microprocessors, wherein a processing time lag is provided between when a first one of the at least two microprocessors outputs data to the third comparison microprocessor and when a second one of the at least two microprocessors outputs data to the third comparison microprocessor.

2. The microprocessor based safety system according to claim 1, further comprising a single, non-dedicated bus along which output data from the sensors and the output data from each of the at least two microprocessors are transmitted among said at least two microprocessors and said third comparison microprocessor.

3. The microprocessor based safety system according to claim 1, wherein said third comparison microprocessor includes checking means for checking consistency of the output data from each of the at least two microprocessors.

4. The microprocessor based safety system according to claim 3, wherein said checking means includes inhibiting means for preventing said activators from receiving at least some of said output data from one of said at least two microprocessors based on the comparison of said output data from the at least two microprocessors.

5. The microprocessor based safety system according to claim 1, wherein the at least two microprocessors comprise more than two microprocessors and said third comparison microprocessor comprises a majority logic circuit for comparing the out put data of the more than two microprocessors.

6. A microprocessor based safety system according to claim 5, wherein said third comparison microprocessor is contained in any one of the at least two microprocessors.

* * * * *